(12) United States Patent
Houck

(10) Patent No.: US 12,253,412 B2
(45) Date of Patent: Mar. 18, 2025

(54) OPTICAL SENSOR DEVICE

(71) Applicant: VIAVI Solutions Inc., Chandler, AZ (US)

(72) Inventor: William D. Houck, Santa Rosa, CA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 35 days.

(21) Appl. No.: 17/661,179

(22) Filed: Apr. 28, 2022

(65) Prior Publication Data

US 2022/0364917 A1 Nov. 17, 2022

Related U.S. Application Data

(60) Provisional application No. 63/201,808, filed on May 13, 2021.

(51) Int. Cl.
*G01J 3/02* (2006.01)
*G02B 5/20* (2006.01)
*G02B 5/28* (2006.01)

(52) U.S. Cl.
CPC ............ *G01J 3/0229* (2013.01); *G02B 5/201* (2013.01); *G02B 5/288* (2013.01)

(58) Field of Classification Search
CPC .................. G01J 3/0229; G01J 3/1213; G01J 2003/2826; G01J 3/0237; G01J 3/0264; G01J 3/2823; G01J 3/2846; G01J 3/28; G01J 2003/1239; G01J 3/027; G01J 3/2803; G01J 3/0202; G02B 5/201; G02B 5/288; H04N 23/55; H04N 25/13
See application file for complete search history.

(56) References Cited

U.S. PATENT DOCUMENTS

| 10,154,197 B2 | 12/2018 | Bhat et al. |
| 2007/0188769 A1 | 8/2007 | Rohaly et al. |
| 2018/0027201 A1* | 1/2018 | Sankaranarayanan ....................... G01T 1/295 348/308 |
| 2018/0080822 A1 | 3/2018 | Lau et al. |

(Continued)

OTHER PUBLICATIONS

International Search Report and Written Opinion for Application No. PCT/US2022/072051, mailed on Aug. 16, 2022, 12 pages.

(Continued)

*Primary Examiner* — Jonathan Y Jung
(74) *Attorney, Agent, or Firm* — FOLEY & LARDNER LLP

(57) ABSTRACT

An optical sensor device includes an optical sensor; an optical filter; a phase mask configured to distribute a plurality of light beams associated with a subject in an encoded pattern; a movement component configured to move the phase mask; and one or more processors configured to: obtain, from the optical sensor, a first set of sensor data that indicates information related to first light that originates at the subject and passes through the phase mask when the phase mask is located at a first position; obtain, from the optical sensor, a second set of sensor data that indicates information related to second light that originates at the subject and passes through the phase mask when the phase mask is located at a second position; determine and provide, based on the first set of sensor data and the second set of sensor data, information associated with the subject.

20 Claims, 12 Drawing Sheets

(56) References Cited

U.S. PATENT DOCUMENTS

| | | | |
|---|---|---|---|
| 2018/0247106 A1* | 8/2018 | Javidi | G02B 21/0008 |
| 2019/0246032 A1* | 8/2019 | Bikumandla | H04N 23/67 |
| 2020/0225089 A1 | 7/2020 | Arce et al. | |
| 2020/0300977 A1* | 9/2020 | Rowlands | G01S 7/4814 |
| 2021/0348714 A1* | 11/2021 | Burbridge | G02B 27/646 |
| 2023/0010599 A1* | 1/2023 | Reshetouski | H04N 23/80 |

OTHER PUBLICATIONS

Vivek Boominathan, et al.; "Lensless Imaging A computational renaissance"; Signal Processing for Computational Photography and Displays; IEEE Signal Processing Magazine; Sep. 2, 2016; pp. 23-35.

Grace Kuo, et al.; "DiffuserCam: Diffuser-Based Lensless Cameras"; Imaging and Applied Optics 2017; 3 pages.

\* cited by examiner

OPTICAL SENSOR DEVICE

RELATED APPLICATION

This application claims priority to U.S. Provisional Patent Application No. 63/201,808, for "OPTICAL SENSOR DEVICE," filed on May 13, 2021, the content of which is incorporated by reference herein in its entirety.

BACKGROUND

An optical sensor device may be utilized to capture information concerning light. For example, the optical sensor device may capture information relating to a set of wavelengths associated with the light. The optical sensor device may include a set of sensor elements (e.g., optical sensors, spectral sensors, and/or image sensors) that capture the information. For example, an array of sensor elements may be utilized to capture information relating to multiple wavelengths. The sensor element array may be associated with an optical filter. The optical filter may include one or more channels that respectively pass particular wavelengths to sensor elements of the sensor element array.

SUMMARY

In some implementations, an optical sensor device includes an optical sensor including a set of sensor elements; an optical filter including one or more channels; a phase mask configured to distribute a plurality of light beams associated with a subject in an encoded pattern on an input surface of the optical filter; a movement component configured to move the phase mask to and from a plurality of positions; and one or more processors configured to: obtain, from the optical sensor, a first set of sensor data associated with the subject, wherein the first set of sensor data indicates information related to first light that originates at the subject and passes through the phase mask when the phase mask is located at a first position of the plurality of positions; obtain, from the optical sensor, a second set of sensor data associated with the subject, wherein the second set of sensor data indicates information related to second light that originates at the subject and passes through the phase mask when the phase mask is located at a second position, of the plurality of positions, that is different than the first position; determine, based on the first set of sensor data and the second set of sensor data, information associated with the subject; and perform, based on the information associated with the subject, one or more actions.

In some implementations, an optical sensor device includes a phase mask configured to distribute a plurality of light beams associated with a subject in an encoded pattern; a movement component configured to move the phase mask to and from a plurality of positions; and one or more processors configured to: obtain, from an optical sensor of the optical sensor device, a first set of sensor data associated with the subject, wherein the first set of sensor data indicates information related to first light that originates at the subject and passes through the phase mask when the phase mask is located at a first position of the plurality of positions; obtain, from the optical sensor, a second set of sensor data associated with the subject, wherein the second set of sensor data indicates information related to second light that originates at the subject and passes through the phase mask when the phase mask is located at a second position, of the plurality of positions, that is different than the first position; determine, based on the first set of sensor data and the second set of sensor data, information associated with the subject; and perform, based on the information associated with the subject, one or more actions.

In some implementations, a method includes obtaining, by an optical sensor device and from an optical sensor of the optical sensor device, a first set of sensor data associated with a subject, wherein the first set of sensor data indicates information related to first light that originates at the subject and passes through a phase mask of the optical sensor device when the phase mask is located at a first position; obtaining, by the optical sensor device and from the optical sensor, a second set of sensor data associated with the subject, wherein the second set of sensor data indicates information related to second light that originates at the subject and passes through the phase mask when the phase mask is located at a second position that is different than the first position; determining, by the optical sensor device and based on the first set of sensor data and the second set of sensor data, information associated with the subject; and providing, by the optical sensor device, the information associated with the subject.

DETAILED DESCRIPTION

Figure 1A:
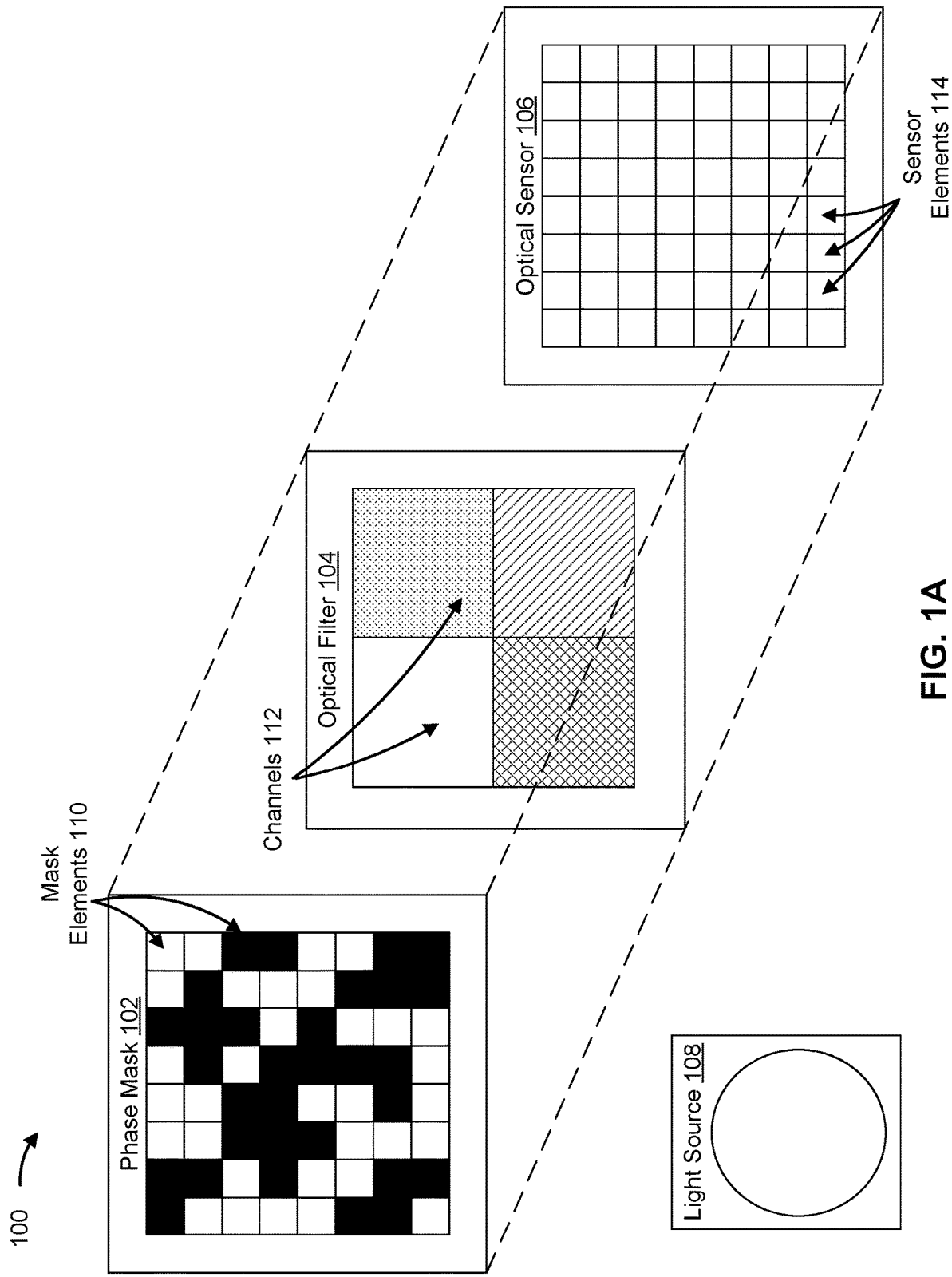
FIGS. 1A-1D are diagrams of an example implementation described herein.

The following detailed description of example implementations refers to the accompanying drawings. The same reference numbers in different drawings may identify the same or similar elements. The following description uses a spectrometer as an example. However, the techniques, principles, procedures, and methods described herein may be used with any sensor, including but not limited to other optical sensors and spectral sensors.

A computational imaging device is a lens-less device that may be used to generate an image of a subject associated with light captured by the computational imaging device. For example, the computational imaging device may include a phase mask (e.g., a diffuser element) that distributes light associated with the subject across an optical sensor (e.g., via a set of spectral filters) and may process pattern information associated with the light that is captured by the optical sensor to generate the image of the subject. However, the computational imaging device is calibrated and optimized for a configuration with the phase mask, the set of spectral filters, and the optical sensor in respective, fixed locations. This results in one data set from which information associated with the subject can be determined (e.g., image information, spectral information, or depth information) and therefore, in some cases, the information associated with the subject has poor resolution. Consequently, additional computational imaging devices and additional computing resources (e.g., processing resources, memory resources, communication resources, and/or power resources, among other examples) are often needed to obtain multiple sets of information associated with the subject that can be further processed to obtain enhanced information associated with the subject.

Some implementations described herein provide an optical sensor device that comprises an optical sensor, an optical filter, a phase mask configured to distribute a plurality of light beams associated with a subject in an encoded pattern on an input surface of the optical filter, a movement component configured to move the phase mask to and from a plurality of positions, and one or more processors. The phase mask may be configured to move between multiple physical positions (e.g., by the movement component to and from a first position, a second position, a third position, and so on). The one or more processors may be configured to obtain, from the optical sensor, sensor data respectively associated with the subject when the phase mask is at each of the multiple physical positions. For example, the one or more processors may obtain a first set of sensor data associated with the first position of the phase mask, a second set of sensor data associated with the second position of the phase mask, a third set of sensor data associated with the third position of the phase mask, and so on.

Each set of sensor data may correspond to a different field of view that is associated with the optical sensor device and that may comprise different image information, different spectral information, different spatial information, and/or different distance information, among other examples. Accordingly, the one or more processors may determine, based on multiple sets of sensor data obtained from the optical sensor when the phase mask is at different positions, enhanced information associated with the subject (e.g., at an enhanced frame rate, for a rolling shutter sensor), such as an enhanced image resolution, an enhanced spectral resolution, an enhanced spatial resolution, an enhanced distance resolution, among other examples (e.g., as compared to information typically determined using a computational imaging device). This improves the functionality of a lens-less optical sensor device, which allows the optical sensor device to be incorporated into user devices, such as mobile phone devices, that require a small form factor and enhanced information associated with the subject. Because the optical sensor device, as a singular device, is able to determine the enhanced information, there is no need to utilize additional computational imaging devices and additional computing resources (e.g., processing resources, memory resources, communication resources, and/or power resources, among other examples) to determine the enhanced information.

FIGS. 1A-1D are diagrams of an overview of an example implementation 100 described herein. As shown in FIG. 1A, example implementation 100 includes a phase mask 102, an optical filter 104, an optical sensor 106, and/or a light source 108. The phase mask 102, the optical filter 104, the optical sensor 106, and/or the light source 108 may be associated with an optical sensor device, which is described in more detail elsewhere herein.

As further shown in FIG. 1A, the phase mask 102 may include one or more mask elements 110. The one or more mask elements 110 may each be transparent or opaque (e.g., reflective, absorbing, and/or the like) and arranged in a pattern (e.g., a non-uniform pattern). For example, as shown in FIG. 1A, transparent mask elements 110 are shown as white squares and opaque mask elements 110 are shown as black squares, and the transparent mask elements 110 and the opaque mask elements 110 are arranged in a grid pattern. In some implementations, the transparent mask elements 110 may respectively comprise one or more diffusive elements to diffuse light that passes through the phase mask 102 via the transparent mask elements 110. The phase mask 102 may be configured to distribute a plurality of light beams that pass through the phase mask 102 in an encoded pattern, such as on an input surface of the optical filter 104. In some implementations, the phase mask 102 may be a coded aperture or another element that produces an encoded pattern of light beams, such as a Fresnel zone plate, an optimized random pattern array, a uniformly redundant array, a hexagonal uniformly redundant array, or a modified uniformly redundant array, among other examples.

The encoded pattern may indicate angular direction information associated with an origin plane (e.g., that is associated with a subject 116 described herein) of the plurality of light beams that are passed by the phase mask 102. In some implementations, the one or more mask elements 110 may be arranged in a pattern that is associated with an algorithm (e.g., a computational encoding algorithm) to cause the phase mask 102 to pass the plurality of light beams and to distribute the plurality of light beams in the encoded pattern (e.g., on the input surface of the optical filter 104).

Figure 1B:
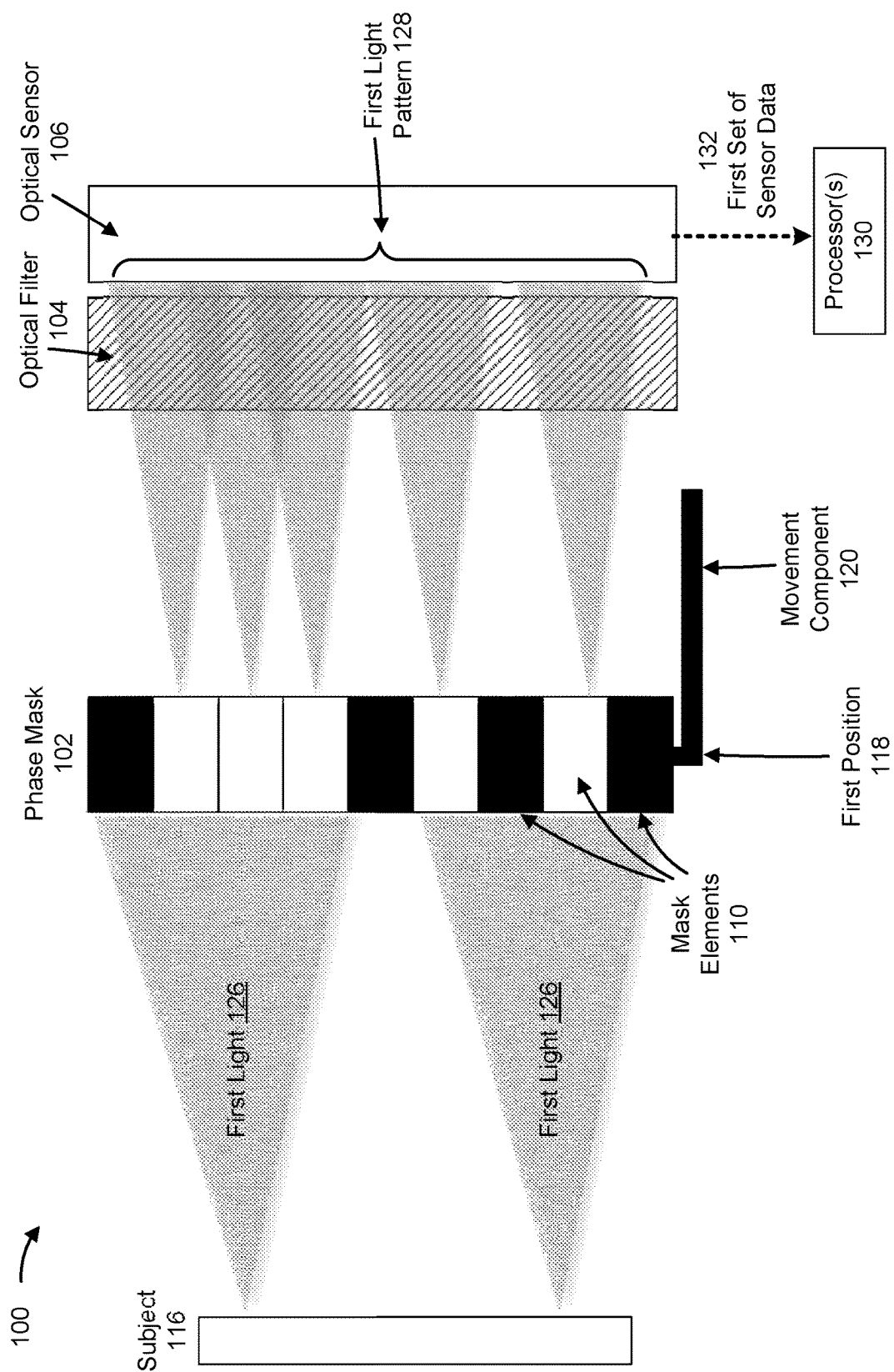
Figure 1C:
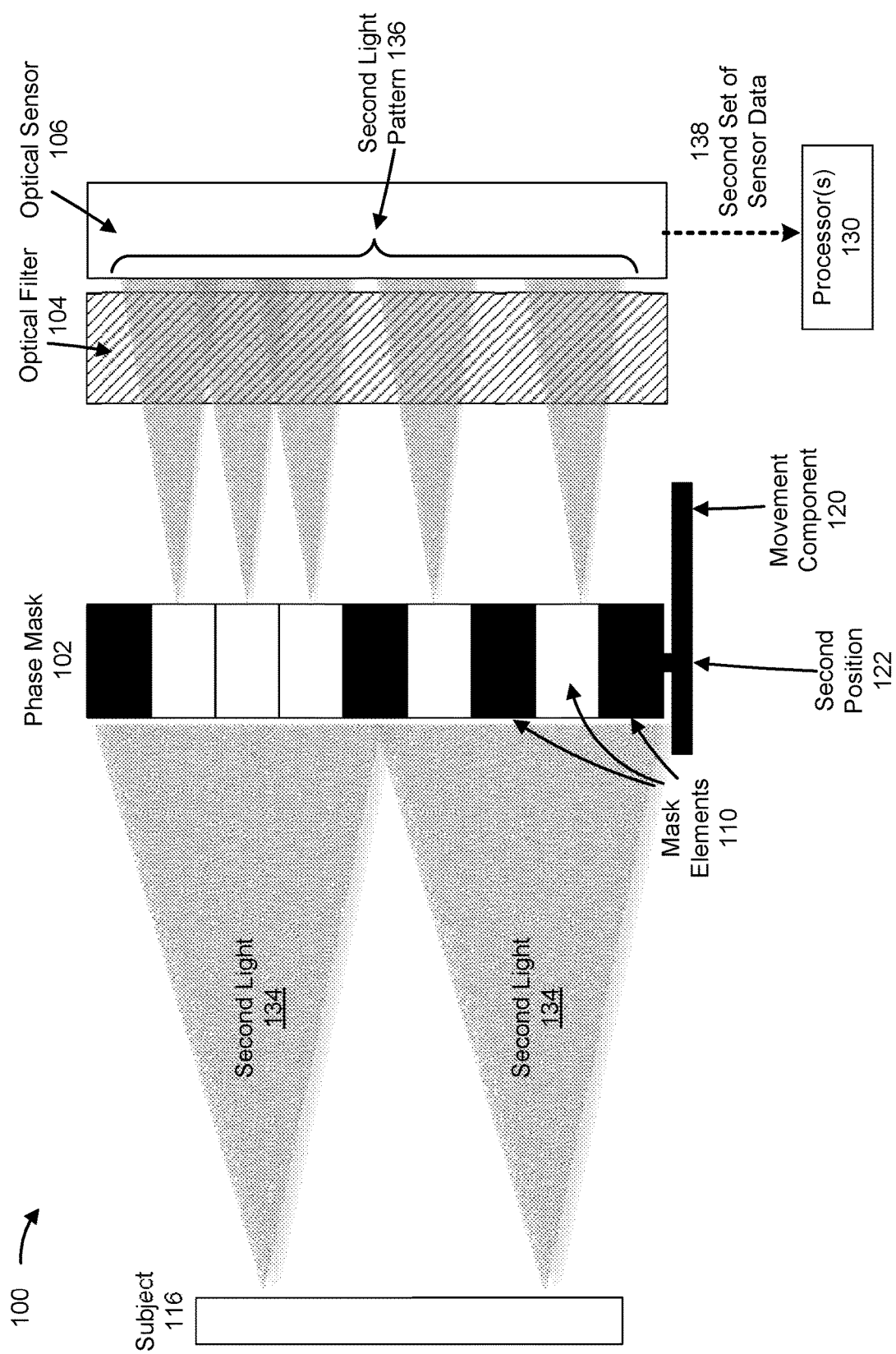
Figure 1D:
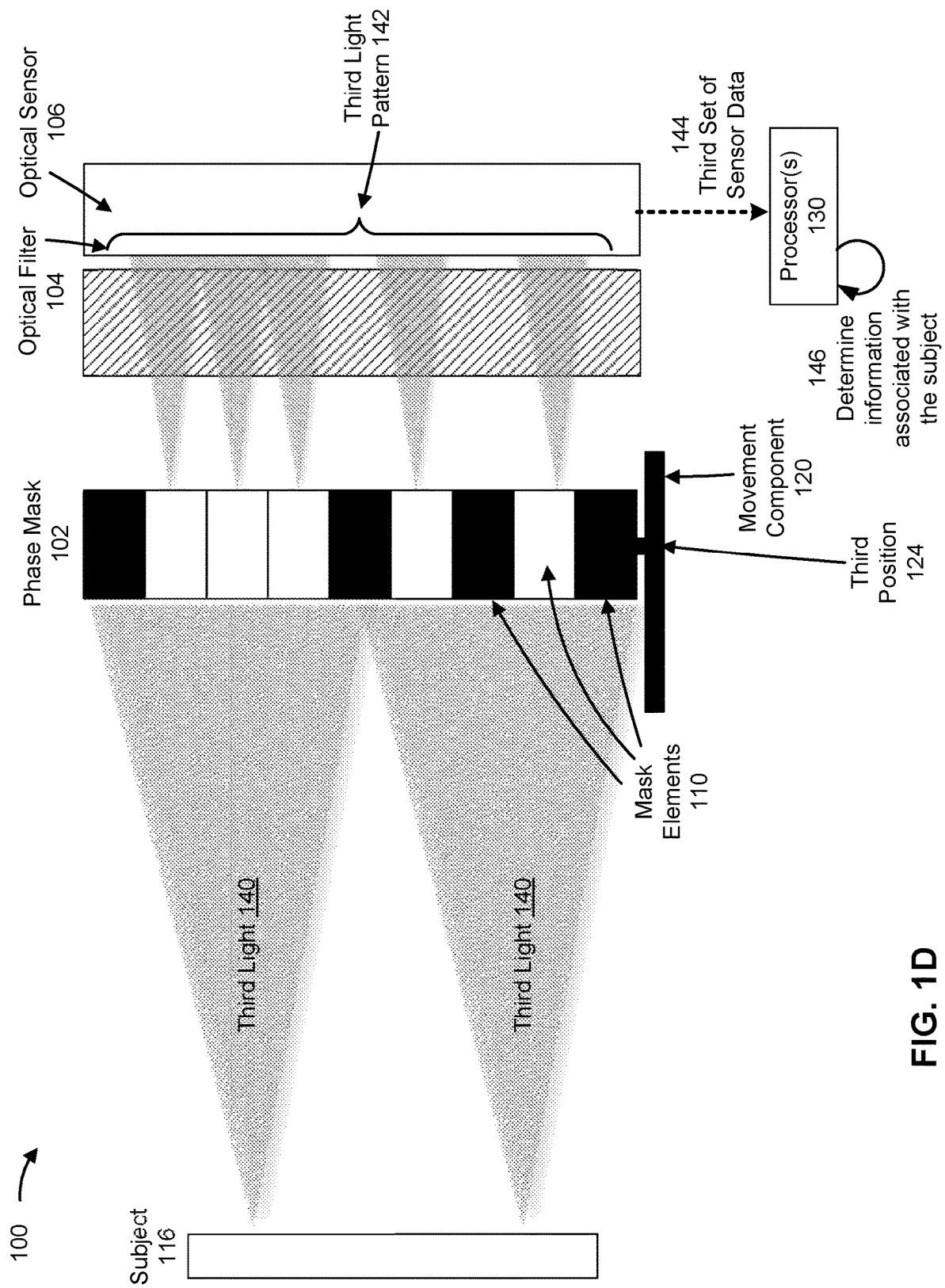

In some implementations, the phase mask 102 may be configured to move between a plurality of positions (e.g., a plurality of different physical positions), such as from a first position, to a second position, to a third position, and so on (e.g., as further described herein in FIGS. 1B-1D). The phase mask 102 may be attached to a movement component (e.g., movement component 120) that enables the phase mask 102 to move between the plurality of positions.

As further shown in FIG. 1A, the optical filter 104 may include one or more channels 112 that respectively pass light in different wavelength ranges to sensor elements 114 of the optical sensor 106. For example, as shown in FIG. 1A, a first optical channel 112 (e.g., indicated by no shading and no patterning) may pass light associated with a first wavelength range to a first set of sensor elements 114 (e.g., that comprises one or more sensor elements 114) of the optical sensor 106, a second optical channel 112 (e.g., indicated by gray shading) may pass light associated with a second wavelength range to a second set of sensor elements 114 of the optical sensor 106, a third optical channel 112 (e.g., indicated by diamond patterning) may pass light associated with a third wavelength range to a third set of sensor elements 114 of the optical sensor 106, and so on. In some implementations, the optical filter 104 may have an angle-dependent wavelength characteristic. For example, a channel 112 may be configured to have "angle shift," such that the channel 112 may pass light associated with a first wavelength range when the light falls incident on the channel 112 within a first incident angle range, may pass light associated with a second wavelength range when the light falls incident on the channel 112 within a second incident angle range, may pass light associated with a third wavelength range when the light falls incident on the channel 112 within a third incident angle range, and so on. The channel 112 may be configured to pass light associated with shorter wavelengths as the light falls on the channel 112 at greater incident angles.

In some implementations, the optical filter 104 may include an optical interference filter. The optical interference filter may have an angle dependent wavelength characteristic, and the angle dependent wavelength characteristic may be represented by an equation of the form:

$$\lambda_\theta = \lambda_0 \left[1 - \frac{n_0}{n_e}\sin^2\theta\right]^{1/2},$$

where $\lambda_\theta$ represents a peak wavelength at incident angle $\theta$, $\lambda_0$ represents a peak wavelength at incident angle 0, $n_0$ represents a refractive index of the incident medium, $n_e$ represents an effective index of the optical interference filter, and $\theta$ is the incident angle of a light beam. Additionally, or alternatively, the optical filter 104 may include, for example, a spectral filter, a multispectral filter, a bandpass filter, a blocking filter, a long-wave pass filter, a short-wave pass filter, a dichroic filter, a linear variable filter (LVF), a circular variable filter (CVF), a Fabry-Perot filter (e.g., a Fabry-Perot cavity filter), a Bayer filter, a plasmonic filter, a photonic crystal filter, a nanostructure and/or metamaterial filter, an absorbent filter (e.g., comprising organic dyes, polymers, and/or glasses, among other examples), and/or the like.

As further shown in FIG. 1A, the optical sensor 106 may include one or more sensor elements 114 (e.g., an array of sensor elements, also referred to herein as a sensor array), each configured to obtain information. For example, a sensor element 114 may provide an indication of intensity of light that is incident on the sensor element 114 (e.g., active/inactive or a more granular indication of intensity). The optical sensor 106 may be configured to collect the information obtained by the one or more sensor elements 114 to generate sensor data.

The light source 108 may include a device capable of generating light (e.g., for illuminating the subject 116 described herein). For example, the light source 108 may include a light emitting diode (LED), such as a phosphor LED. In some implementations, the light source 108 may include a plurality of LEDs. In such a case, a first LED, of the plurality of LEDs, may be associated with a different spectral range than a second LED of the plurality of LEDs. This may enable the addressing of narrow spectral ranges using a plurality of LEDs, rather than addressing a wide spectral range using a single LED. In some implementations, the light source 108 may include a single modulated LED or a plurality of modulated LEDs. When the light source 108 includes one or more modulated LEDs, the optical sensor device may modulate a power supply of the light source 108. Using a modulated LED may enable driving the LED to a higher power than a continuous-wave LED. Furthermore, modulation may improve signal-to-noise properties of sensing performed using light from the modulated LED.

As shown in FIGS. 1B-1D, the optical sensor device associated with the phase mask 102, the optical filter 104, the optical sensor 106, and/or the light source 108 may be configured to capture information relating to a subject 116. As further shown in FIGS. 1B-1D, the phase mask 102 may be attached to a movement component 120 that may include, for example, a track and an engagement component (e.g., a motor, or another component, not shown in FIGS. 1B-1D). The movement component 120 may be configured to move the phase mask 102 to and from a plurality of positions (e.g., physical positions), such as to and from a first position 118 shown in FIG. 1B, a second position 122 shown in FIG. 1C, and a third position 124 shown in FIG. 1D. As further shown in FIGS. 1B-1D, the movement component 120 may be configured to move the phase mask 102 in a direction that is parallel to a propagation direction of light from the subject 116 to the phase mask 102, the optical filter 104, and/or the optical sensor 106 (e.g., configured to move the phase mask 102 in a horizontal direction). The movement component 120 may be configured to cause the phase mask 102 to remain at a particular position for a particular amount of time (e.g., to facilitate the optical sensor 106 generating sensor data based on light received by the optical sensor, as described herein). For example, the particular amount may be a particular number of milliseconds, seconds, minutes, or hours. The movement component 120 may be configured to cause the phase mask 102 to remain at the plurality of positions for same or different amounts of time.

As shown in FIG. 1B, when the phase mask 102 is located at the first position 118 (e.g., because the movement component 120 causes the phase mask 102 to be located at the first position 118), first light 126 may originate from the subject 116 (e.g., may emit, or reflect, from one or more points of the subject 116) and may be received by the optical sensor device. The first light 126 may pass through the phase mask 102 (e.g., when the phase mask 102 is located at the first position 118) and the optical filter 104, and may be received by the optical sensor 106. The phase mask 102 may distribute the first light 126 in an encoded first light pattern 128 (e.g., on the input surface of the optical filter 104).

As further shown in FIG. 1B, the optical sensor device may be associated with one or more processors 130 and may provide, as shown by reference number 132, a first set of sensor data to the one or more processors 130. The first set of sensor data may indicate information relating to the first light 126 that originates at the subject 116, such as information related to a distribution (e.g., by the phase mask 102 when the phase mask 102 is located at the first position 118), of the first light 126 in the encoded first light pattern 128 (e.g., on the input surface of the optical filter 104). For example, the first set of sensor data may indicate an intensity of the first light 126 that is distributed in the encoded first light pattern 128 (e.g., by the phase mask 102 at the first position 118) and that is received by the one or more sensor elements 114 of the optical sensor 106.

As shown in FIG. 1C, when the phase mask 102 is located at the second position 122 (e.g., because the movement component 120 causes the phase mask 102 to be located at the second position 122, such as based on receiving a notification from the one or more processors 130 that indicates that the one or more processors 130 obtained the first set of sensor data), second light 134 may originate from the subject 116 (e.g., may emit, or reflect, from the one or more points of the subject 116) and may be received by the optical sensor device. The second light 134 may pass through the phase mask 102 (e.g., when the phase mask 102 is located at the second position 122) and the optical filter 104, and may be received by the optical sensor 106. The phase mask 102 may distribute the second light 134 in an encoded second light pattern 136 (e.g., on the input surface of the optical filter 104).

As further shown in FIG. 1C, the optical sensor device may provide, as shown by reference number 138, a second set of sensor data to the one or more processors 130. The second set of sensor data may indicate information relating to the second light 134 that originates at the subject 116, such as information related to a distribution (e.g., by the phase mask 102 when the phase mask 102 is located at the second position 122), of the second light 134 in the encoded second light pattern 136 (e.g., on the input surface of the optical filter 104). For example, the second set of sensor data may indicate an intensity of the second light 134 that is distributed in the encoded second light pattern 136 (e.g., by the phase mask 102 at the second position 122) and that is received by the one or more sensor elements 114 of the optical sensor 106.

As shown in FIG. 1D, when the phase mask 102 is located at the third position 124 (e.g., because the movement component 120 causes the phase mask 102 to be located at the third position 124, such as based on receiving a notification from the one or more processors 130 that indicates that the one or more processors 130 obtained the second set of sensor data), third light 140 may originate from the subject 116 (e.g., may emit, or reflect, from the one or more points of the subject 116) and may be received by the optical sensor device. The third light 140 may pass through the phase mask 102 (e.g., when the phase mask 102 is located at the third position 124) and the optical filter 104, and may be received by the optical sensor 106. The phase mask 102 may distribute the third light 140 in an encoded third light pattern 142 (e.g., on the input surface of the optical filter 104).

As further shown in FIG. 1D, the optical sensor device may provide, as shown by reference number 144, a third set of sensor data to the one or more processors 130. The third set of sensor data may indicate information relating to the third light 140 that originates at the subject 116, such as information related to a distribution (e.g., by the phase mask 102 when the phase mask 102 is located at the third position 124), of the third light 140 in the encoded third light pattern 142 (e.g., on the input surface of the optical filter 104). For example, the third set of sensor data may indicate an intensity of the third light 140 that is distributed in the encoded third light pattern 142 (e.g., by the phase mask 102 at the third position 124) and that is received by the one or more sensor elements 114 of the optical sensor 106.

As further shown in FIG. 1D, and by reference number 146, the one or more processors 130 may process the first set of sensor data, the second set of sensor data, and/or the third set of sensor data to determine information associated with the subject 116. For example, to determine the information associated with the subject 116, the one or more processors 130 may process the first set of sensor data, the second set of sensor data, and/or the third set of sensor data using at least one algorithm associated with decoding the encoded first light pattern 128, the encoded second light pattern 136, and/or the encoded third light pattern 142. In this way, the one or more processors 130 may determine image information, spectral information, spatial information, and/or distance information among other examples, associated with the subject 116.

For example, the one or more processors 130 may identify (e.g., by searching a data structure that is stored in and/or that is accessible to the one or more processors 130) one or more algorithms for reconstructing at least one image from the encoded first light pattern 128, the encoded second light pattern 136, and/or the encoded third light pattern 142, and may process the first set of sensor data, the second set of sensor data, and/or the third set of sensor data using the one or more algorithms to determine image information associated with the subject 116 (e.g., determine one or more images of the subject 116).

As another example, the one or more processors 130 may identify, based on the first set of sensor data, the second set of sensor data, and/or the third set of sensor data, a particular sensor element 114 of the optical sensor 106 that received one or more respective light beams of the first light 126, the second light 134, and/or the third light 140. The one or more processors 130 may determine, based on configuration information associated with the phase mask 102 located at the first position 118, the second position 122, and/or the third position 124 (e.g., that is included in a data structure that is accessible to the one or more processors 130), that the particular sensor element 114 is associated with at least one particular optical channel 112 of the optical filter 104 (e.g., the particular sensor element 114 is configured to receive light beams passed by the at least one particular optical channel 112) and may identify the at least one particular optical channel 112 as having passed the one or more respective light beams of the first light 126, the second light 134, and/or the third light 140 to the particular sensor element 114. Further, the one or more processors 130 may determine, based on other configuration information associated with the optical filter 104 and the optical sensor 106 (e.g., that is included in a same or different data structure that is accessible to the one or more processors 130), that the at least one particular optical channel 112 is configured to pass light beams associated with at least one particular subrange of a particular wavelength range and therefore may determine that the one or more respective light beams of the first light 126, the second light 134, and/or the third light 140 are associated with the at least one particular subrange of the particular wavelength range. In this way, the one or more processors 130 may determine spectral values that indicate amounts of light associated with different subranges of different wavelength ranges that were received by the plurality of optical channels 112 and passed to the plurality of sensor elements 114 (e.g., when the phase mask 102 is located at the first position 118, the second position 122, and/or the third position 124).

In an additional example, the one or more processors 130 may identify (e.g., by searching a data structure that is stored in and/or that is accessible to the one or more processors 130) one or more algorithms for reconstructing spatial information from the encoded first light pattern 128, the encoded second light pattern 136, and/or the encoded third light pattern 142 and may process the first set of sensor data, the second set of sensor data, and/or the third set of sensor data using the one or more algorithms to determine spatial information associated with the subject 116. For example, the one or more processors 130 may process the first set of sensor data, the second set of sensor data, and/or the third set of sensor data using the one or more algorithms to determine respective locations of incidence and respective angles of incidence of light beams, of the first light 126, the second light 134, and/or the third light 140, when the light beams impinge on the optical filter 104. Accordingly, the one or more processors 130 may determine distance information associated with the subject 116 (e.g., a distance of the subject 116 from the optical filter 104 and/or the optical sensor 106). For example, the one or more processors 130 may use a computer vision technique (e.g., a triangulation computation technique, a stereo vision technique, and/or the like) based on the respective locations of incidence of the light beams on the optical filter 104 and the respective angles of incidence of the light beams on the optical filter 104 to determine a distance to the subject 116.

In some implementations, the one or more processors 130 may provide the information associated with the subject 116 (e.g., the image information, the spectral information, the spatial information, and/or the distance information) to another device, such as a user device. For example, the one or more processors 130 may send the information associated with the subject 116 to the user device to cause the user device to display the information associated with the subject 116 on a display of the user device. As another example, the one or more processors 130 may send the information associated with the subject 116 to the user device to cause the user device to determine one or more characteristics of the subject 116, such as a material composition of the subject 116, a temperature of the subject 116, an identification of the subject 116 (e.g., using object identification and/or facial recognition techniques), a health-related measurement of the subject 116, a location of the subject 116, and/or a trajectory of the subject 116, among other examples. In some implementations, the one or more processors 130 may trigger an action to be performed based on the measurement (e.g., dispatching a technician to observe and/or test the subject 116, administering a medication to the subject 116, providing a notification for a user to perform an activity associated with the subject 116, and/or the like).

As indicated above, FIGS. 1A-1D are provided as one or more examples. Other examples may differ from what is described with regard to FIGS. 1A-1D.

Figure 2A:
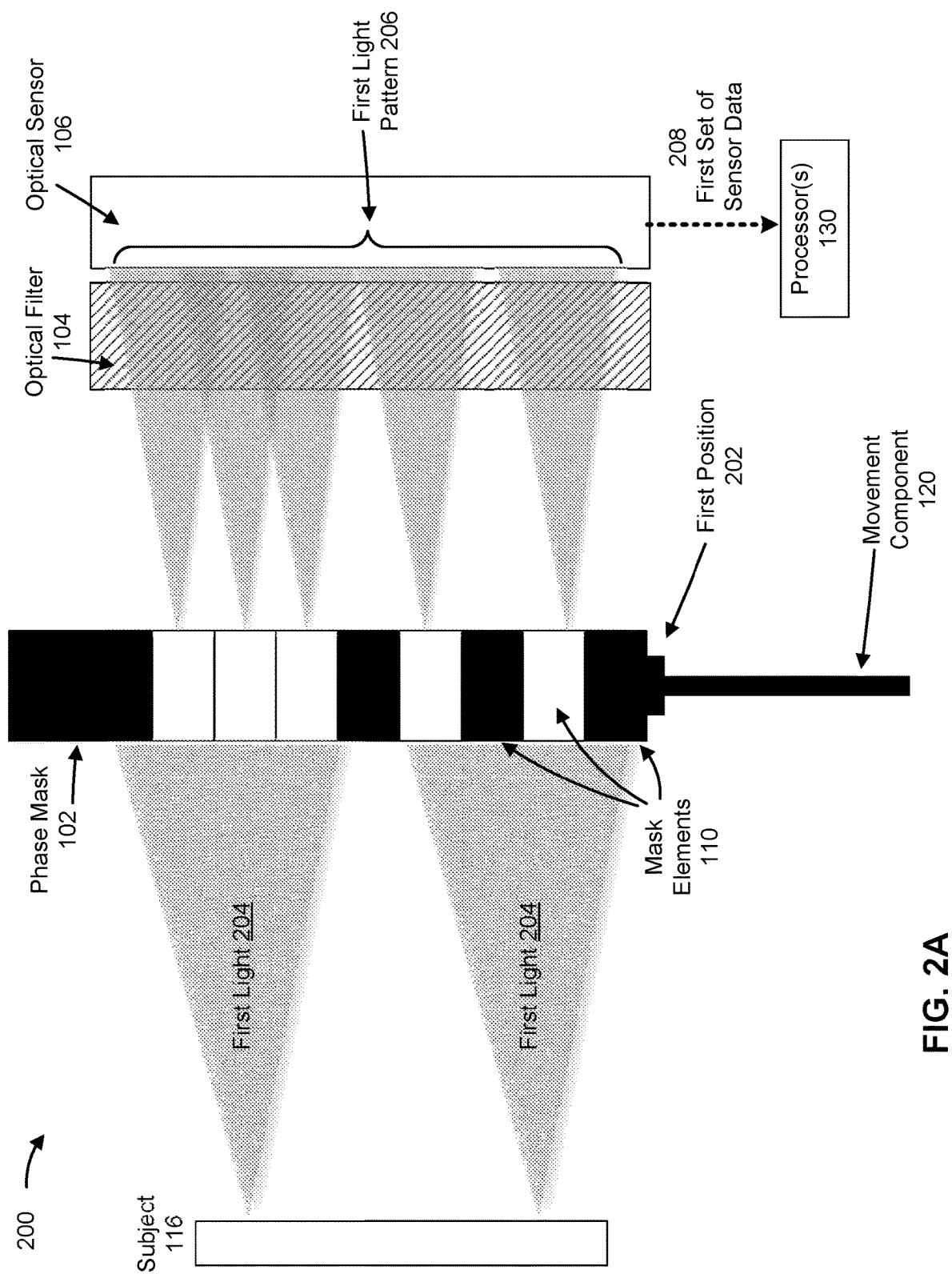
FIGS. 2A-2C are diagrams of an example implementation described herein.
Figure 2B:
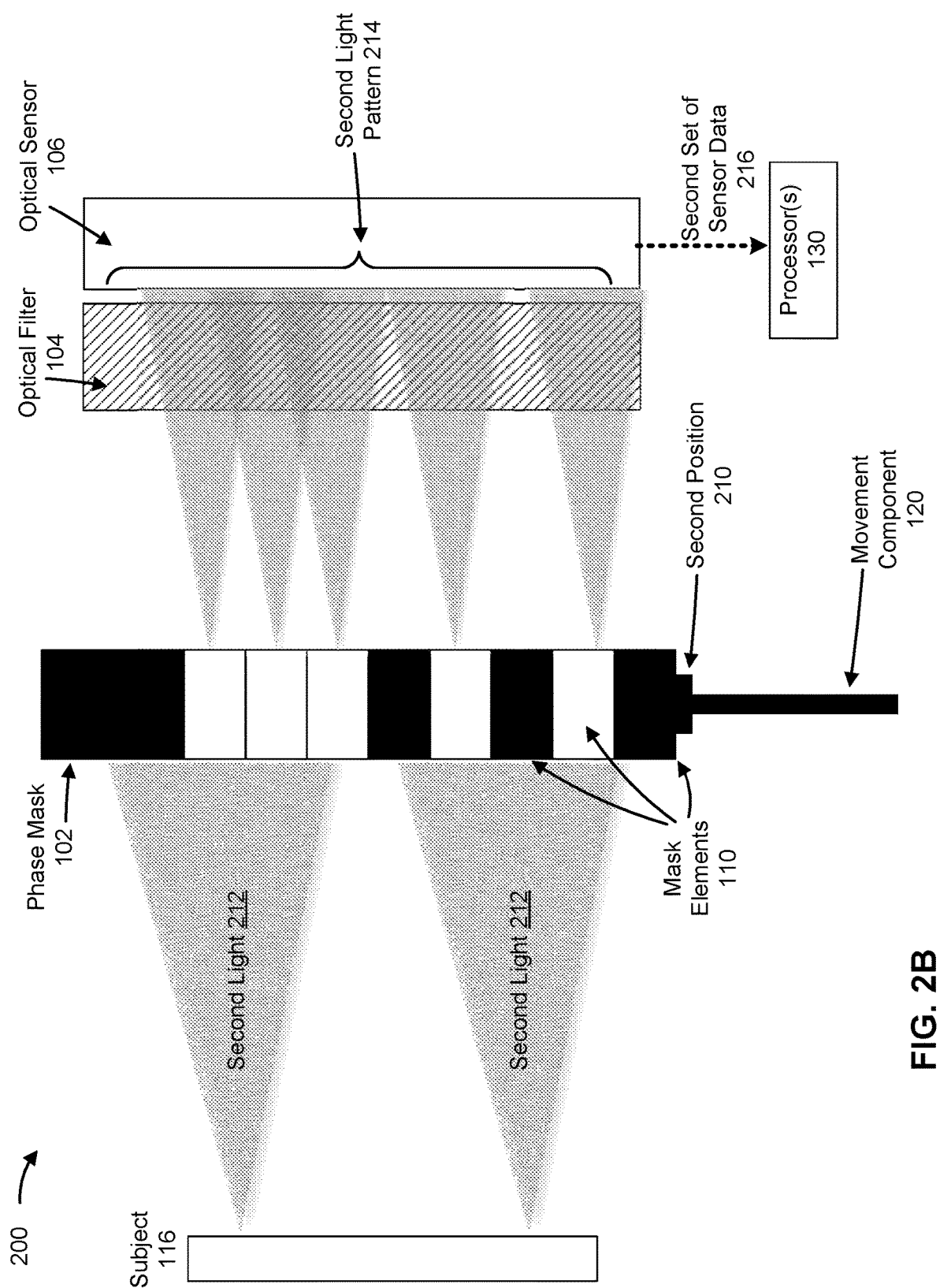
Figure 2C:
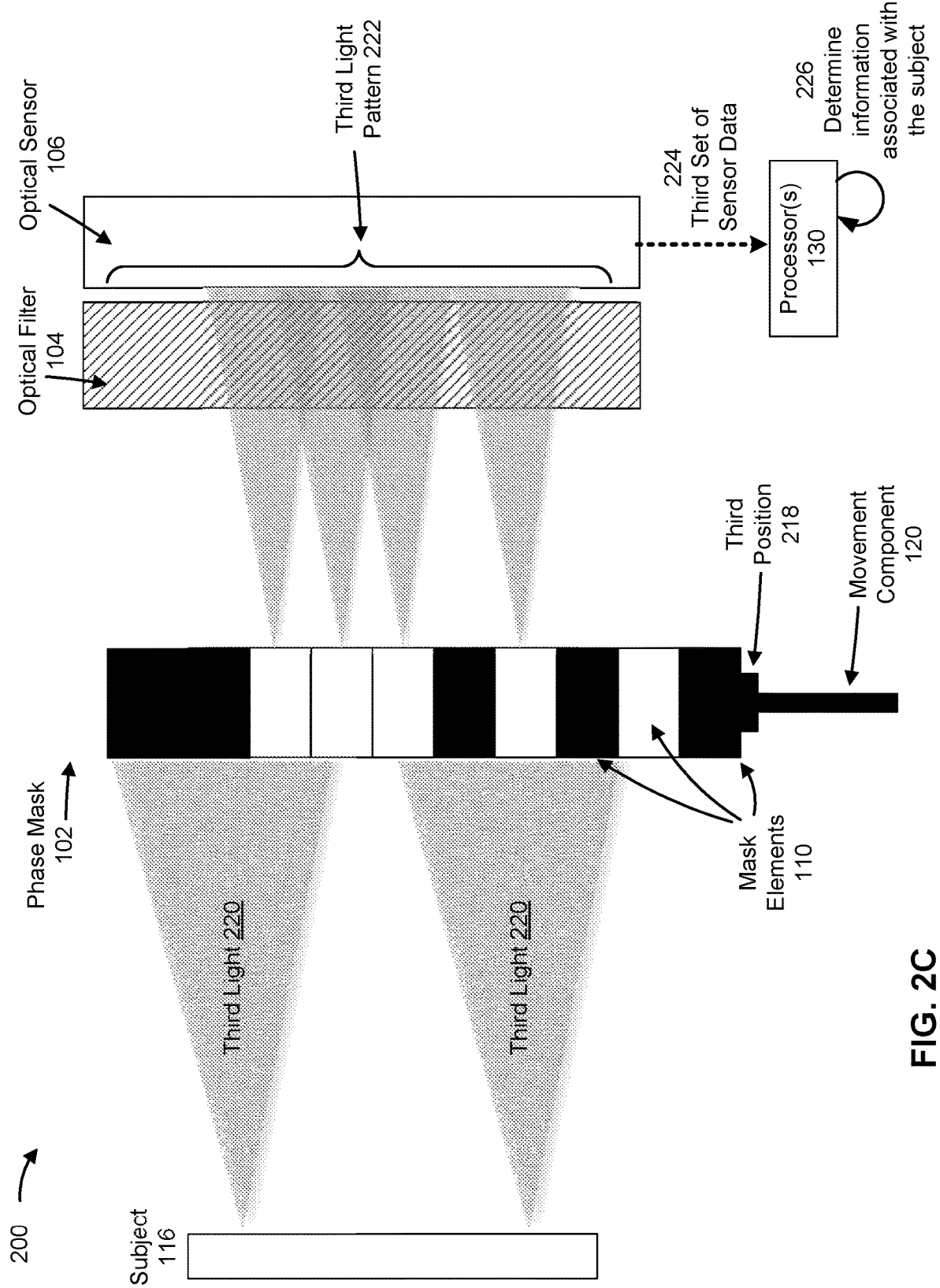

FIGS. 2A-2C are diagrams of an overview of an example implementation 200 described herein. As shown in FIGS. 2A-2C, example implementation 200 includes the phase mask 102, the optical filter 104, the optical sensor 106, the light source 108, the movement component, and/or the one or more processors 130 (e.g., that may be associated with an optical sensor device described herein). As further shown in FIGS. 2A-2C, the phase mask 102 may be attached to the movement component 120 (e.g., that is configured to move the phase mask 102 to and from a plurality of positions), which may be configured to move the phase mask 102 in a direction that is orthogonal to a propagation direction of light from the subject 116 to the phase mask 102, the optical filter 104, and/or the optical sensor 106 (e.g., configured to move the phase mask 102 in a vertical direction).

As shown in FIG. 2A, when the phase mask 102 is located at a first position 202 (e.g., because the movement component 120 causes the phase mask 102 to be located at the first position 202), first light 204 may originate from the subject 116 (e.g., may emit, or reflect, from one or more points of the subject 116) and may be received by the optical sensor device. The first light 204 may pass through the phase mask 102 (e.g., when the phase mask 102 is located at the first position 202) and the optical filter 104, and may be received by the optical sensor 106. The phase mask 102 may distribute the first light 204 in an encoded first light pattern 206 (e.g., on the input surface of the optical filter 104).

As further shown in FIG. 2A, the optical sensor device may provide, as shown by reference number 208, a first set of sensor data to the one or more processors 130. The first set of sensor data may indicate information relating to the first light 204 that originates at the subject 116, such as information related to a distribution (e.g., by the phase mask 102 when the phase mask 102 is located at the first position 202), of the first light 204 in the encoded first light pattern 206 (e.g., on the input surface of the optical filter 104). For example, the first set of sensor data may indicate an intensity of the first light 204 that is distributed in the encoded first light pattern 206 (e.g., by the phase mask 102 at the first position 202) and that is received by the one or more sensor elements 114 of the optical sensor 106.

As shown in FIG. 2B, when the phase mask 102 is located at a second position 210 (e.g., because the movement component 120 causes the phase mask 102 to be located at the second position 210), second light 212 may originate from the subject 116 (e.g., may emit, or reflect, from the one or more points of the subject 116) and may be received by the optical sensor device. The second light 212 may pass through the phase mask 102 (e.g., when the phase mask 102 is located at the second position 210) and the optical filter 104, and may be received by the optical sensor 106. The phase mask 102 may distribute the second light 212 in an encoded second light pattern 214 (e.g., on the input surface of the optical filter 104).

As further shown in FIG. 2B, the optical sensor device may provide, as shown by reference number 216, a second set of sensor data to the one or more processors 130. The second set of sensor data may indicate information relating to the second light 212 that originates at the subject 116, such as information related to a distribution (e.g., by the phase mask 102 when the phase mask 102 is located at the second position 210), of the second light 212 in the encoded second light pattern 214 (e.g., on the input surface of the optical filter 104). For example, the second set of sensor data may indicate an intensity of the second light 212 that is distributed in the encoded second light pattern 214 (e.g., by the phase mask 102 at the second position 210) and that is received by the one or more sensor elements 114 of the optical sensor 106.

As shown in FIG. 2C, when the phase mask 102 is located at a third position 218 (e.g., because the movement component 120 causes the phase mask 102 to be located at the third position 218), third light 220 may originate from the subject 116 (e.g., may emit, or reflect, from the one or more points of the subject 116) and may be received by the optical sensor device. The third light 220 may pass through the phase mask 102 (e.g., when the phase mask 102 is located at the third position 218) and the optical filter 104, and may be received by the optical sensor 106. The phase mask 102 may distribute the third light 220 in an encoded third light pattern 222 (e.g., on the input surface of the optical filter 104).

As further shown in FIG. 2C, the optical sensor device may provide, as shown by reference number 224, a third set of sensor data to the one or more processors 130. The third set of sensor data may indicate information relating to the third light 220 that originates at the subject 116, such as information related to a distribution (e.g., by the phase mask 102 when the phase mask 102 is located at the third position 218), of the third light 220 in the encoded third light pattern 222 (e.g., on the input surface of the optical filter 104). For example, the third set of sensor data may indicate an intensity of the third light 220 that is distributed in the encoded third light pattern 222 (e.g., by the phase mask 102 at the third position 218) and that is received by the one or more sensor elements 114 of the optical sensor 106.

As further shown in FIG. 2C, and by reference number 226, the one or more processors 130 may process the first set of sensor data, the second set of sensor data, and/or the third set of sensor to determine information associated with the subject 116 (e.g., in a similar manner as that described herein in relation to FIG. 1D and reference number 144). For example, to determine the information associated with the subject 116, the one or more processors 130 may process the first set of sensor data, the second set of sensor data, and/or the third set of sensor data using at least one algorithm associated with decoding the encoded first light pattern 206, the encoded second light pattern 214, and/or the encoded third light pattern 222. In this way, the one or more processors 130 may determine image information, spectral information, spatial information, and/or distance information among other examples, associated with the subject 116.

As indicated above, FIGS. 2A-2C are provided as one or more examples. Other examples may differ from what is described with regard to FIGS. 2A-2C.

Figure 3A:
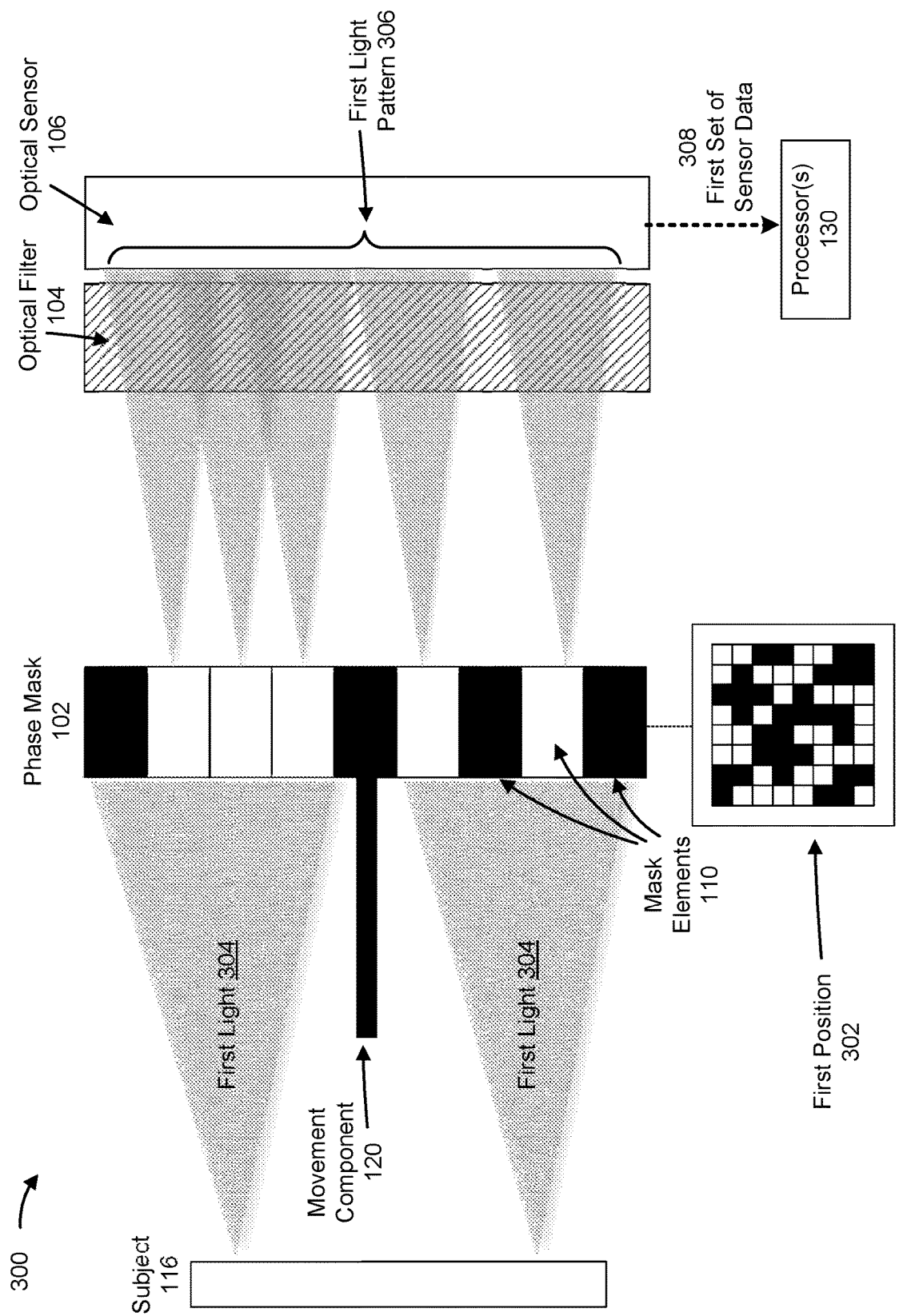
FIGS. 3A-3B are diagrams of an example implementation described herein.
Figure 3B:
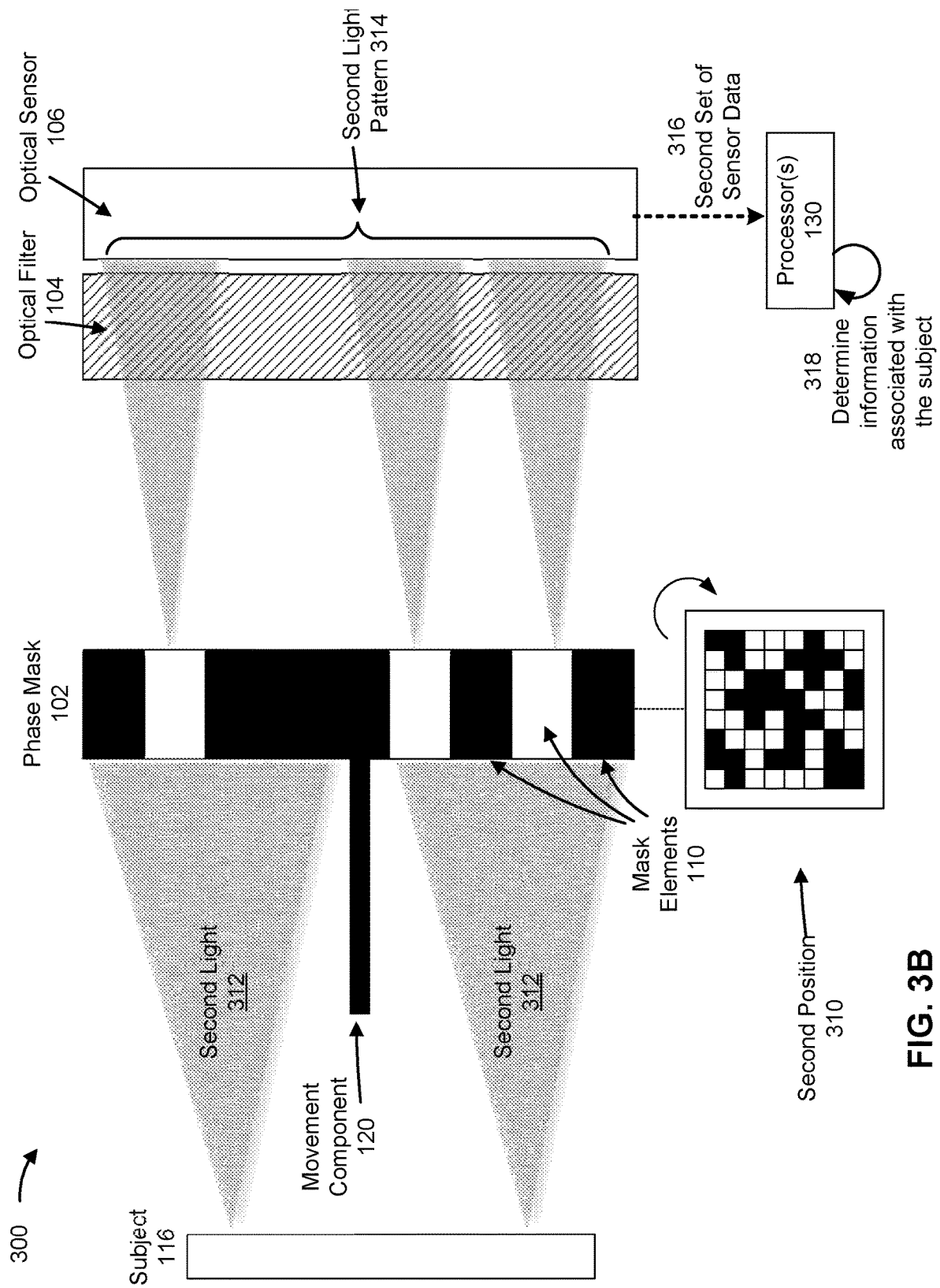

FIGS. 3A-3B are diagrams of an overview of an example implementation 300 described herein. As shown in FIGS. 3A-3B, example implementation 300 includes the phase mask 102, the optical filter 104, the optical sensor 106, the light source 108, the movement component, and/or the one or more processors 130 (e.g., that may be associated with an optical sensor device described herein). As further shown in FIGS. 3A-3B, the phase mask 102 may be attached to the movement component 120 (e.g., that is configured to move the phase mask 102 to and from a plurality of positions), which may be configured to move the phase mask 102 around a pivot point of the phase mask 102 (e.g., configured to turn or rotate the phase mask 102 around the pivot point of the phase mask 102).

As shown in FIG. 3A, when the phase mask 102 is located at a first position 302 (e.g., because the movement component 120 causes the phase mask 102 to be located at the first position 302), first light 304 may originate from the subject 116 (e.g., may emit, or reflect, from one or more points of the subject 116) and may be received by the optical sensor device. The first light 304 may pass through the phase mask 102 (e.g., when the phase mask 102 is located at the first position 302) and the optical filter 104, and may be received by the optical sensor 106. The phase mask 102 may distribute the first light 304 in an encoded first light pattern 306 (e.g., on the input surface of the optical filter 104).

As further shown in FIG. 3A, the optical sensor device may provide, as shown by reference number 308, a first set of sensor data to the one or more processors 130. The first set of sensor data may indicate information relating to the first light 304 that originates at the subject 116, such as information related to a distribution (e.g., by the phase mask 102 when the phase mask 102 is located at the first position 302), of the first light 304 in the encoded first light pattern 306 (e.g., on the input surface of the optical filter 104). For example, the first set of sensor data may indicate an intensity of the first light 304 that is distributed in the encoded first light pattern 306 (e.g., by the phase mask 102 at the first position 302) and that is received by the one or more sensor elements 114 of the optical sensor 106.

As shown in FIG. 3B, when the phase mask 102 is located at a second position 310 (e.g., because the movement component 120 causes the phase mask 102 to be located at the second position 310), second light 312 may originate from the subject 116 (e.g., may emit, or reflect, from the one or more points of the subject 116) and may be received by the optical sensor device. The second light 312 may pass through the phase mask 102 (e.g., when the phase mask 102 is located at the second position 310) and the optical filter 104, and may be received by the optical sensor 106. The phase mask 102 may distribute the second light 312 in an encoded second light pattern 314 (e.g., on the input surface of the optical filter 104).

As further shown in FIG. 3B, the optical sensor device may provide, as shown by reference number 316, a second set of sensor data to the one or more processors 130. The second set of sensor data may indicate information relating to the second light 312 that originates at the subject 116, such as information related to a distribution (e.g., by the phase mask 102 when the phase mask 102 is located at the second position 310), of the second light 312 in the encoded second light pattern 314 (e.g., on the input surface of the optical filter 104). For example, the second set of sensor data may indicate an intensity of the second light 312 that is distributed in the encoded second light pattern 314 (e.g., by the phase mask 102 at the second position 310) and that is received by the one or more sensor elements 114 of the optical sensor 106.

As further shown in FIG. 3B, and by reference number 318, the one or more processors 130 may process the first set of sensor data and/or the second set of sensor data to determine information associated with the subject 116 (e.g., in a similar manner as that described herein in relation to FIG. 1D and reference number 144). For example, to determine the information associated with the subject 116, the one or more processors 130 may process the first set of sensor data and/or the second set of sensor data using at least one algorithm associated with decoding the encoded first light pattern 306 and/or the encoded second light pattern 314. In this way, the one or more processors 130 may determine image information, spectral information, spatial information, and/or distance information among other examples, associated with the subject 116.

As indicated above, FIGS. 3A-3B are provided as one or more examples. Other examples may differ from what is described with regard to FIGS. 3A-3B.

Figure 4:
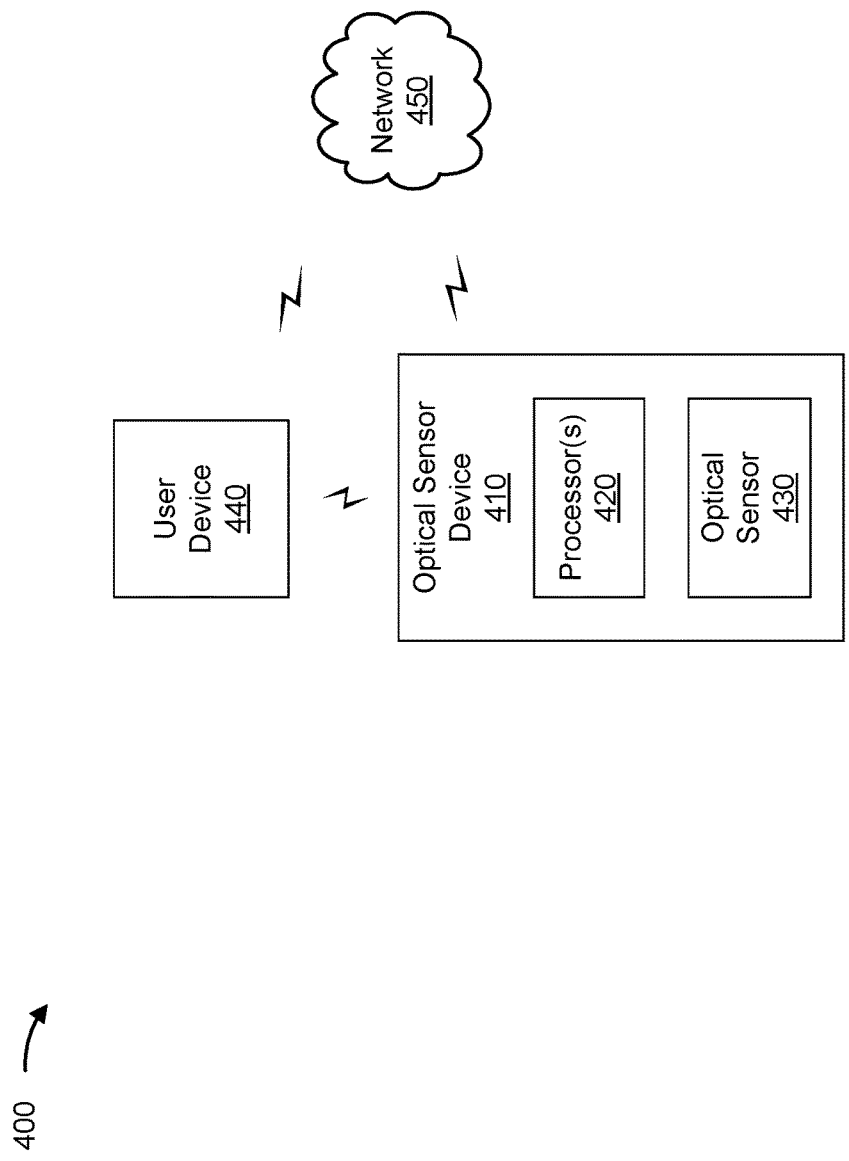
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include an optical sensor device 410 that may include one or more processors 420 (e.g., that correspond to the one or more processors 130 described herein) and an optical sensor 430 (e.g., that corresponds to the optical sensor 106 described herein). The environment 400 may also include a user device 440 and a network 450. Devices of environment 400 may interconnect via wired connections, wireless connections, or a combination of wired and wireless connections.

Optical sensor device 410 may include an optical device capable of storing, processing, and/or routing image information, spectral information, spatial information, and/or distance information, among other examples, associated with a subject. For example, optical sensor device 410 may include a computational camera device that captures an image of the subject (e.g., using a computational encoding algorithm). As another example, optical sensor device 410 may include a spectrometer device that performs spectroscopy, such as a spectral optical sensor device (e.g., a binary multispectral optical sensor device that performs vibrational spectroscopy, such as a near infrared (NIR) spectrometer, a mid-infrared spectroscopy (mid-IR), Raman spectroscopy, and/or the like). In some implementations, optical sensor device 410 may be incorporated into a user device 440, such as a wearable spectrometer and/or the like. In some implementations, optical sensor device 410 may receive information from and/or transmit information to another device in environment 400, such as user device 440.

In some implementations, optical sensor device 410 may comprise a spectral imaging camera. A spectral imaging camera is a device that can capture an image of a scene. A spectral imaging camera (or a processor 420 associated with the spectral imaging camera) may be capable of determining spectral content or changes in spectral content at different points in an image of a scene, such as any point in an image of a scene. In some implementations, optical sensor device 410 may comprise a spectral imaging camera capable of performing hyperspectral imaging. For example, optical sensor device 410 may include an optical filter (e.g., optical filter 104 described herein in). In some implementations, the optical filter may be disposed on optical sensor 430.

In some implementations, optical sensor device 410 may comprise a phase mask (e.g., phase mask 102 described herein). For example, the phase mask may be configured to distribute light in an encoded pattern across an input surface of the optical filter when the light is en route to optical sensor 430. Each point in an image captured by optical sensor device 410 may be encoded with spatio-spectral information by the phase mask. In some implementations, optical sensor device 410 may comprise a movement component (e.g., movement component 120 described herein) that is configured to move the phase mask to and from a plurality of positions.

Optical sensor device 410 may include one or more processors 420, described in more detail in connection with FIG. 3.

Optical sensor device 410 may include an optical sensor 430. Optical sensor 430 includes a device capable of sensing light. For example, optical sensor 430 may include an image sensor, a multispectral sensor, a spectral sensor, and/or the like. In some implementations, optical sensor 430 may include a silicon (Si) based sensor, an indium-gallium-arsenide (InGaAs) based sensor, a lead-sulfide (PbS) based sensor, or a germanium (Ge) based sensor, may utilize one or more sensor technologies, such as a complementary metal-oxide-semiconductor (CMOS) technology, or a charge-coupled device (CCD) technology, among other examples. In some implementations, optical sensor 430 may include a front-side illumination (FSI) sensor, a back-side illumination (BSI) sensor, and/or the like. In some implementations, optical sensor 430 may be included in a camera of optical sensor device 410 and/or user device 440.

User device 440 includes one or more devices capable of receiving, generating, storing, processing, and/or providing the image information, the spectral information, the spatial information, and/or the distance information, among other examples, associated with the subject. For example, user device 440 may include a communication and/or computing device, such as a mobile phone (e.g., a smart phone, a radiotelephone, and/or the like), a computer (e.g., a laptop computer, a tablet computer, a handheld computer, and/or the like), a gaming device, a wearable communication device (e.g., a smart wristwatch, a pair of smart eyeglasses, and/or the like), or a similar type of device. In some implementations, user device 440 may receive information from and/or transmit information to another device in environment 400, such as optical sensor device 410.

Network 450 includes one or more wired and/or wireless networks. For example, network 450 may include a cellular network (e.g., a long-term evolution (LTE) network, a code division multiple access (CDMA) network, a 4G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. For example, although optical sensor device 410 and user device 440 are described as separate devices, optical sensor device 410 and user device 440 may be implemented as a single device. Additionally, or alternatively, a set of devices (e.g., one or more devices) of environment 400 may perform one or more functions described as being performed by another set of devices of environment 400.

Figure 5:
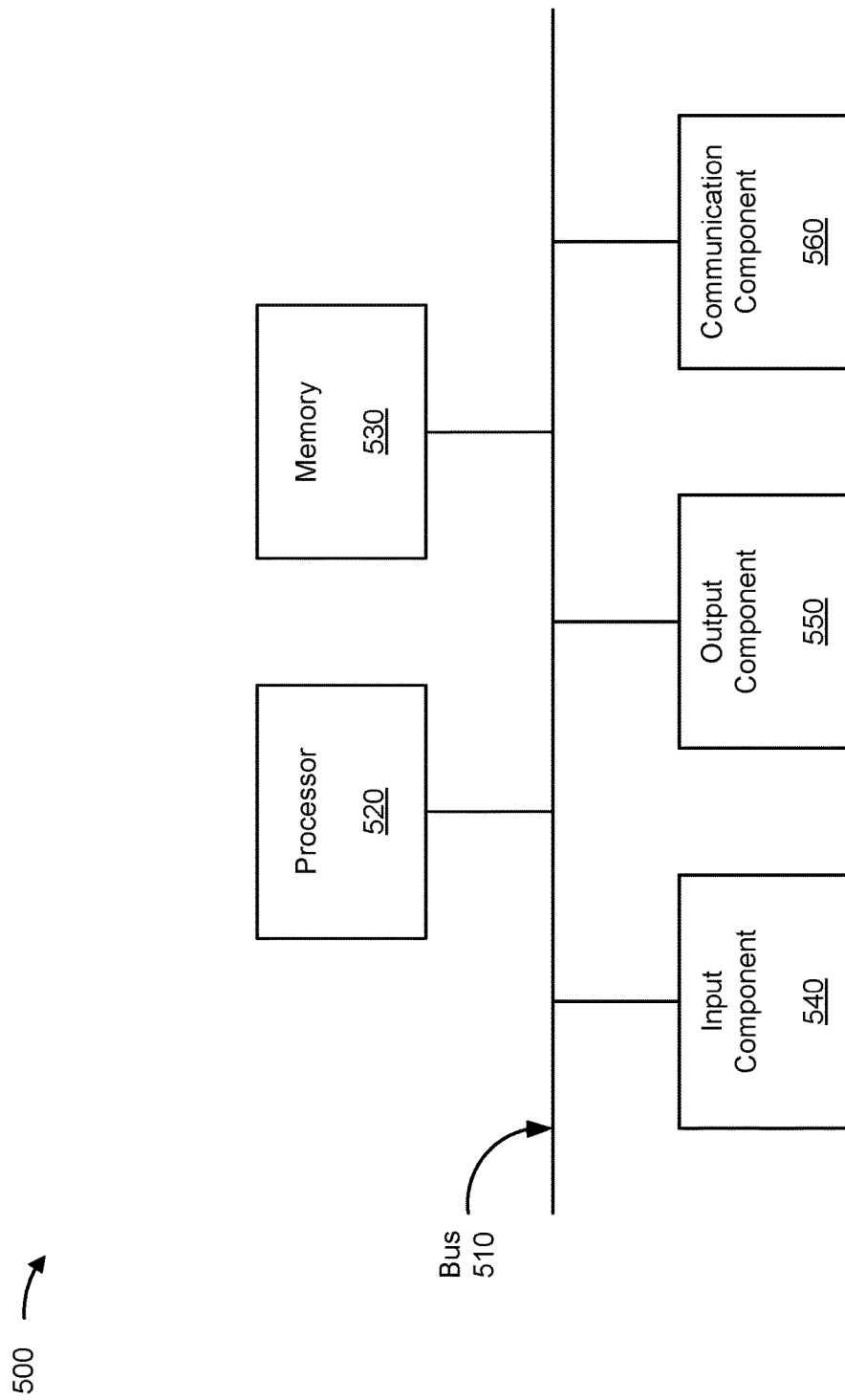
FIG. 5 is a diagram of example components of one or more devices of FIG. 4.

FIG. 5 is a diagram of example components of a device 500, which may correspond to optical sensor device 410 and/or user device 440. In some implementations, optical sensor device 410 and/or user device 440 include one or more devices 500 and/or one or more components of device 500. As shown in FIG. 5, device 500 may include a bus 510, a processor 520, a memory 530, an input component 540, an output component 550, and a communication component 560.

Bus 510 includes one or more components that enable wired and/or wireless communication among the components of device 500. Bus 510 may couple together two or more components of FIG. 5, such as via operative coupling, communicative coupling, electronic coupling, and/or electric coupling. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform one or more operations or processes described elsewhere herein.

Memory 530 includes volatile and/or nonvolatile memory. For example, memory 530 may include random access memory (RAM), read only memory (ROM), a hard disk drive, and/or another type of memory (e.g., a flash memory, a magnetic memory, and/or an optical memory). Memory 530 may include internal memory (e.g., RAM, ROM, or a hard disk drive) and/or removable memory (e.g., removable via a universal serial bus connection). Memory 530 may be a non-transitory computer-readable medium. Memory 530 stores information, instructions, and/or software (e.g., one or more software applications) related to the operation of device 500. In some implementations, memory 530 includes one or more memories that are coupled to one or more processors (e.g., processor 520), such as via bus 510.

Input component 540 enables device 500 to receive input, such as user input and/or sensed input. For example, input component 540 may include a touch screen, a keyboard, a keypad, a mouse, a button, a microphone, a switch, a sensor, a global positioning system sensor, an accelerometer, a gyroscope, and/or an actuator. Output component 550 enables device 500 to provide output, such as via a display, a speaker, and/or a light-emitting diode. Communication component 560 enables device 500 to communicate with other devices via a wired connection and/or a wireless connection. For example, communication component 560 may include a receiver, a transmitter, a transceiver, a modem, a network interface card, and/or an antenna.

Device 500 may perform one or more operations or processes described herein. For example, a non-transitory computer-readable medium (e.g., memory 530) may store a set of instructions (e.g., one or more instructions or code) for execution by processor 520. Processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry is used instead of or in combination with the instructions to perform one or more operations or processes described herein. Additionally, or alternatively, processor 520 may be configured to perform one or more operations or processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
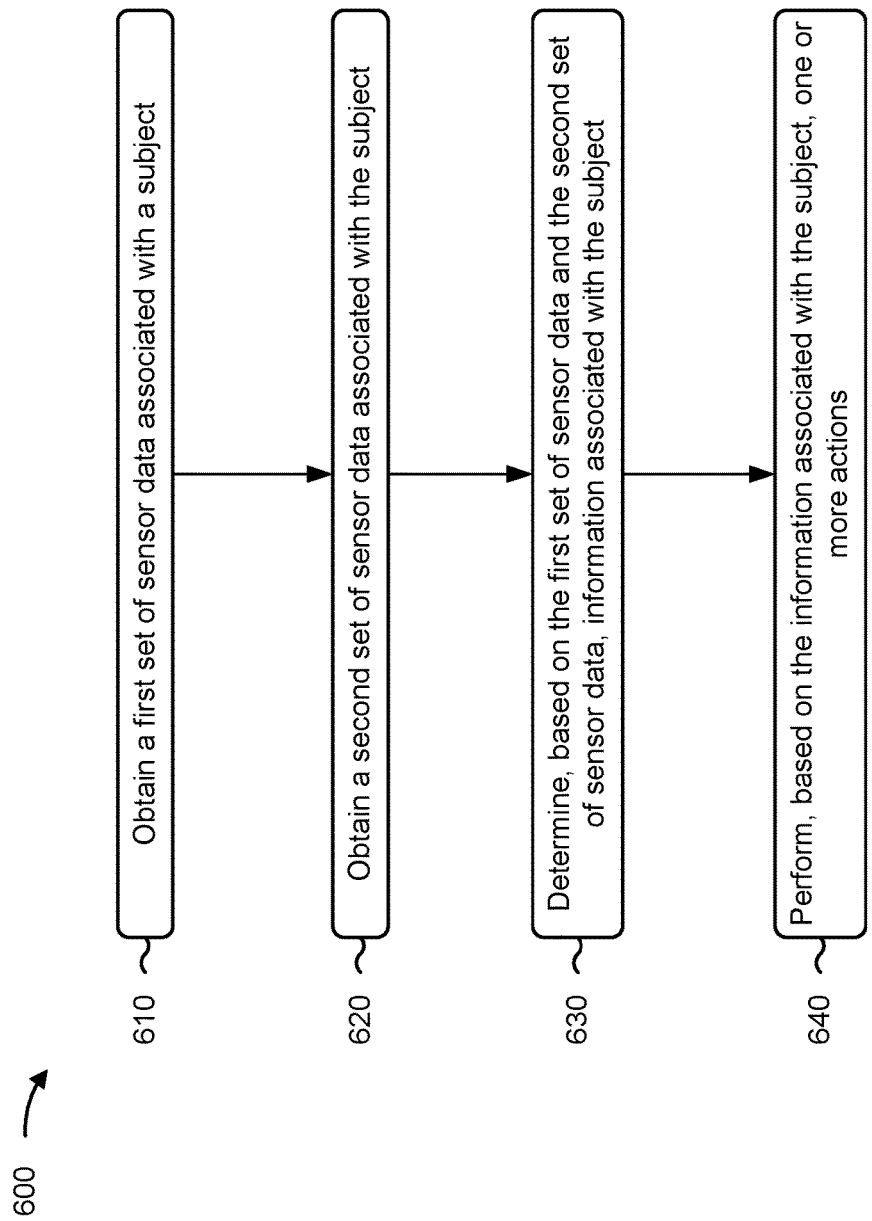
FIG. 6 is a flowchart of example processes relating to an optical sensor device.

FIG. 6 is a flowchart of an example process 600 associated with an optical sensor device (e.g., optical sensor device 410). In some implementations, one or more process blocks of FIG. 6 may be performed by the optical sensor device, such as by one or more processors (e.g., one or more processors 130 or one or more processors 520) of the optical sensor device. In some implementations, one or more process blocks of FIG. 6 may be performed by another device or a group of devices separate from or including the one or more processors, such as a user device (e.g., user device 440). Additionally, or alternatively, one or more process blocks of FIG. 6 may be performed by one or more components of device 500, such as processor 520, memory 530, storage component 540, input component 550, output component 560, and/or communication component 570.

In some implementations, the optical sensor device may include, in addition to the one or more processors, an optical sensor including a set of sensor elements; an optical filter including one or more channels; a phase mask configured to distribute a plurality of light beams associated with a subject in an encoded pattern on an input surface of the optical filter; and/or a movement component configured to move the phase mask to and from a plurality of positions.

As shown in FIG. 6, process 600 may include obtaining a first set of sensor data associated with a subject (block 610). For example, the optical sensor device may obtain, from an optical sensor of the optical sensor device, a first set of sensor data associated with a subject, as described above. In some implementations, the first set of sensor data indicates information related to first light that originates at the subject and passes through a phase mask of the optical sensor device when the phase mask is located at a first position.

As further shown in FIG. 6, process 600 may include obtaining a second set of sensor data associated with the subject (block 620). For example, the optical sensor device may obtain, from the optical sensor, a second set of sensor data associated with the subject, as described above. In some implementations, the second set of sensor data indicates information related to second light that originates at the subject and passes through the phase mask when the phase mask is located at a second position that is different than the first position.

As further shown in FIG. 6, process 600 may include determining, based on the first set of sensor data and the second set of sensor data, information associated with the subject (block 630). For example, the optical sensor device may determine, based on the first set of sensor data and the second set of sensor data, information associated with the subject, as described above. The information associated with the subject may include image information associated with the subject, spectral information associated with the subject, spatial information associated with the subject, or distance information associated with the subject.

As further shown in FIG. 6, process 600 may include performing, based on the information associated with the subject, one or more actions (block 640). For example, the optical sensor device may perform, based on the information associated with the subject, one or more actions, as described above.

Process 600 may include additional implementations, such as any single implementation or any combination of implementations described below and/or in connection with one or more other processes described elsewhere herein.

In a first implementation, process 600 includes the first set of sensor data indicates information related to a distribution, by the phase mask when the phase mask is located at the first position, of the first light in an encoded first light pattern, and the second set of sensor data indicates information related to a distribution, by the phase mask when the phase mask is located at the second position, of the second light in an encoded second light pattern.

In a second implementation, alone or in combination with the first implementation, determining the information associated with the subject comprises processing, using at least one algorithm associated with decoding the encoded first light pattern and the encoded second light pattern, the first set of sensor data and the second set of sensor data, to determine the information associated with the subject.

In a third implementation, alone or in combination with one or more of the first and second implementations, performing the one or more actions includes providing the information associated with the subject. For example, the optical sensor device may cause display of the information associated with the subject, such as by sending the information associated with the subject to another device to cause display of the information associated with the subject.

In a fourth implementation, alone or in combination with one or more of the first through third implementations, the information associated with the subject includes image information associated with the subject and determining the information associated with the subject comprises identifying one or more algorithms for reconstructing at least one image from the encoded first light pattern and the encoded second light pattern, and processing, using the one or more algorithms, the first set of sensor data and the second set of sensor data to determine the image information associated with the subject.

In a fifth implementation, alone or in combination with one or more of the first through fourth implementations, the information associated with the subject includes spatial information and distance information associated with the subject and determining the information associated with the subject comprises identifying one or more algorithms for reconstructing spatial information from the encoded first light pattern and the encoded second light pattern; processing, using the one or more algorithms, the first set of sensor data and the second set of sensor data to determine respective locations of incidence and respective angles of incidence of light beams of the first light and the second light on the optical filter; and determining, based on the respective locations of incidence and the respective angles of incidence of the light beams of the first light and the second light on the optical filter, a distance to the subject.

In a sixth implementation, alone or in combination with one or more of the first through fifth implementations, the information associated with the subject includes spectral information associated with the subject and determining the information associated with the subject comprises identifying, based on the first set of sensor data and the second set of sensor data, a particular sensor element, of the set of sensor elements of the optical sensor, that received one or more respective light beams of the first light and the second light; determining, based on configuration information associated with the phase mask located at the first position and the second position, that the particular sensor element is associated with at least one particular optical channel of the one or more channels of the optical filter; determining, based on other configuration information associated with the optical filter and the optical sensor, that the at least one particular optical channel is configured to pass light beams associated with at least one particular subrange of a particular wavelength range; and determining, based on determining that the at least one particular optical channel is configured to pass light beams associated with the at least one particular subrange of the particular wavelength range, that the one or more respective light beams of the first light and the second light are associated with the at least one particular subrange of the particular wavelength range.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical sensor device, comprising:
   an optical sensor including a set of sensor elements;
   an optical filter including one or more channels;
   a phase mask configured to distribute a plurality of light beams associated with a subject in an encoded pattern on an input surface of the optical filter,
      wherein the phase mask comprises a plurality of transparent mask elements and a plurality of opaque mask elements arranged in a pattern, and
      wherein the plurality of transparent mask elements comprises one or more diffusive elements;
   a movement component configured to move the phase mask to and from a plurality of positions,
      wherein the movement component is configured to move the phase mask in a direction that is parallel to a propagation direction of light from the subject to the phase mask; and
   one or more processors configured to:
      obtain, from the optical sensor, a first set of sensor data associated with the subject when the phase mask is located at a first position of the plurality of positions;
      obtain, from the optical sensor, a second set of sensor data associated with the subject when the phase mask is located at a second position, of the plurality of positions, that is different than the first position;
      obtain, from the optical sensor, a third set of sensor data associated with the subject when the phase mask is located at a third position, of the plurality of positions, that is different than the first position and the second position;
      determine, based on the first set of sensor data, the second set of sensor data, and the third set of sensor data, information associated with the subject; and
      perform, based on the information associated with the subject, one or more actions.

2. The optical sensor device of claim 1, wherein the information associated with the subject includes at least one of:
   image information associated with the subject,
   spectral information associated with the subject,
   spatial information associated with the subject, or
   distance information associated with the subject.

3. The optical sensor device of claim 1, wherein:
   the first set of sensor data indicates information related to a distribution, by the phase mask when the phase mask is located at the first position, of first light in an encoded first light pattern on the input surface of the optical filter; and
   the second set of sensor data indicates information related to a distribution, by the phase mask when the phase mask is located at the second position, of second light in an encoded second light pattern on the input surface of the optical filter.

4. The optical sensor device of claim 3, wherein the one or more processors, to determine the information associated with the subject, are configured to:

process, using at least one algorithm associated with decoding the encoded first light pattern and the encoded second light pattern, the first set of sensor data and the second set of sensor data to determine the information associated with the subject.

5. The optical sensor device of claim 3, wherein the information associated with the subject includes image information associated with the subject, and
wherein the one or more processors, to determine the information associated with the subject, are configured to:
identify one or more algorithms for reconstructing at least one image from the encoded first light pattern and the encoded second light pattern; and
process, using the one or more algorithms, the first set of sensor data and the second set of sensor data to determine the image information associated with the subject.

6. The optical sensor device of claim 3, wherein the information associated with the subject includes spatial information and distance information associated with the subject, and
wherein the one or more processors, to determine the information associated with the subject, are configured to:
identify one or more algorithms for reconstructing spatial information from the encoded first light pattern and the encoded second light pattern;
process, using the one or more algorithms, the first set of sensor data and the second set of sensor data to determine respective locations of incidence and respective angles of incidence of light beams of the first light and the second light on the optical filter; and
determine, based on the respective locations of incidence and the respective angles of incidence of the light beams of the first light and the second light on the optical filter, a distance to the subject.

7. The optical sensor device of claim 1, wherein the information associated with the subject includes spectral information associated with the subject,
wherein the first set of sensor data indicates information related to first light that originates at the subject and passes through the phase mask when the phase mask is located at the first position,
wherein the second set of sensor data indicates information related to second light that originates at the subject and passes through the phase mask when the phase mask is located at the second position, and
wherein the one or more processors, to determine the information associated with the subject, are configured to:
identify, based on the first set of sensor data and the second set of sensor data, a particular sensor element, of the set of sensor elements, that received one or more respective light beams of the first light and the second light;
determine, based on configuration information associated with the phase mask located at the first position and the second position, that the particular sensor element is associated with at least one particular optical channel of the one or more channels of the optical filter;
determine, based on other configuration information associated with the optical filter and the optical sensor, that the at least one particular optical channel is configured to pass light beams associated with at least one particular subrange of a particular wavelength range; and
determine, based on determining that the at least one particular optical channel is configured to pass light beams associated with the at least one particular subrange of the particular wavelength range, that the one or more respective light beams of the first light and the second light are associated with the at least one particular subrange of the particular wavelength range.

8. The optical sensor device of claim 1, wherein the one or more processors, to perform the one or more actions, are configured to:
cause display of the information associated with the subject.

9. An optical sensor device, comprising:
a phase mask including a plurality of transparent mask elements and a plurality of opaque mask elements arranged in a pattern,
wherein the plurality of transparent mask elements comprises one or more diffusive elements configured to diffuse light that passes through the phase mask;
a movement component configured to move the phase mask to and from a plurality of positions,
wherein the movement component is configured to move the phase mask in a direction that is parallel to a propagation direction of light from a subject to the phase mask; and
one or more processors configured to:
obtain, from an optical sensor of the optical sensor device, a first set of sensor data associated with the subject when the phase mask is located at a first position of the plurality of positions;
obtain, from the optical sensor, a second set of sensor data associated with the subject when the phase mask is located at a second position, of the plurality of positions, that is different than the first position;
determine, based on the first set of sensor data and the second set of sensor data, information associated with the subject; and
perform, based on the information associated with the subject, one or more actions.

10. The optical sensor device of claim 9, wherein:
the movement component causes the phase mask to be located at the first position; and
the movement component causes the phase mask to be located at the second position.

11. The optical sensor device of claim 9, wherein:
the first set of sensor data indicates information related to a distribution, by the phase mask when the phase mask is located at the first position, of first light in an encoded first light pattern; and
the second set of sensor data indicates information related to a distribution, by the phase mask when the phase mask is located at the second position, of second light in an encoded second light pattern.

12. The optical sensor device of claim 11, wherein the one or more processors, to determine the information associated with the subject, are configured to:
process, using at least one algorithm associated with decoding the encoded first light pattern and the encoded second light pattern, the first set of sensor data and the second set of sensor data to determine the information associated with the subject.

13. The optical sensor device of claim 9, wherein the movement component is configured to move the phase mask in a direction that is orthogonal to the propagation direction of light from the subject to the phase mask.

14. The optical sensor device of claim 9, wherein the movement component is configured to move the phase mask around a pivot point of the phase mask.

15. The optical sensor device of claim 9, wherein the optical sensor device is a lens-less optical sensor device.

16. A method, comprising:
- obtaining, by an optical sensor device and from an optical sensor of the optical sensor device, a first set of sensor data associated with a subject when a phase mask is located at a first position,
  - wherein the phase mask includes a plurality of transparent mask elements and a plurality of opaque mask elements arranged in a pattern, and
  - wherein the plurality of transparent mask elements comprises one or more diffusive elements;
- obtaining, by the optical sensor device and from the optical sensor, a second set of sensor data associated with the subject when the phase mask is located at a second position that is different than the first position,
  - wherein a direction of movement of the phase mask between the first position and the second position is parallel to a propagation direction of light from the subject to the phase mask;
- determining, by the optical sensor device, information associated with the subject based on the first set of sensor data and the second set of sensor data; and
- providing, by the optical sensor device, the information associated with the subject.

17. The method of claim 16, wherein:
- the first set of sensor data indicates information related to a distribution, by the phase mask when the phase mask is located at the first position, of first light in an encoded first light pattern; and
- the second set of sensor data indicates information related to a distribution, by the phase mask when the phase mask is located at the second position, of second light in an encoded second light pattern.

18. The method of claim 17, wherein determining the information associated with the subject comprises:
- processing, using at least one algorithm associated with decoding the encoded first light pattern and the encoded second light pattern, the first set of sensor data and the second set of sensor data, to determine the information associated with the subject.

19. The method of claim 16, wherein providing the information associated with the subject comprises:
- sending the information associated with the subject to another device to cause display of the information associated with the subject.

20. The method of claim 16, further comprising:
- moving the phase mask between a plurality of positions including the first position and the second position.

* * * * *